US006812854B1

(12) United States Patent
Edwin et al.

(10) Patent No.: US 6,812,854 B1
(45) Date of Patent: Nov. 2, 2004

(54) MIRROR MOUNTED EMERGENCY VEHICLE ALERT SYSTEM

(76) Inventors: Luke Edwin, 14530 Buffalo Speedway, Houston, TX (US) 77045; Ted McLindon Edwin, 14530 Buffalo Speedway, Houston, TX (US) 77045

( * ) Notice: Subject to any disclaimer, the term of this patent is extended or adjusted under 35 U.S.C. 154(b) by 0 days.

(21) Appl. No.: 10/288,893

(22) Filed: Nov. 5, 2002

Related U.S. Application Data

(60) Provisional application No. 60/330,952, filed on Nov. 5, 2001.

(51) Int. Cl.[7] .................................................. G08G 1/00

(52) U.S. Cl. ......................... 340/901; 340/902; 701/35; 362/494

(58) Field of Search ................................ 340/901, 902, 340/903, 905; 701/35; 362/494

(56) References Cited

U.S. PATENT DOCUMENTS 4,158,190 A * 6/1979 Stefanov ..................... 340/902
4,646,210 A * 2/1987 Skogler et al. ............. 362/142
5,495,243 A * 2/1996 McKenna ................... 340/902
5,631,638 A * 5/1997 Kaspar et al. .............. 340/902
5,660,457 A * 8/1997 Lyons ........................ 362/494
6,449,540 B1 * 9/2002 Rayner ........................ 701/35

* cited by examiner

*Primary Examiner*—John Tweel
(74) *Attorney, Agent, or Firm*—Kenneth A. Roddy

(57) ABSTRACT

An emergency vehicle alert system coupled with an interior rearview mirror assembly attached to the windshield or a header portion of a vehicle that will visually and audibly alert a driver of the presence of an emergency vehicle or railroad train in the proximity of the driver. A sound transducer having a probe engaged with the windshield receives acoustical warning signals from emergency vehicles and other vehicles, converts them into electrical audio frequency signals and sends them to an audio pre-amplifier which amplifies the signals and feeds them to a sound discriminator calibrated to evaluate and discriminate between signals that fit within parameters set for particular emergency sound frequencies. A piezo beeper alarm and an audio output amplifier and programmed voice warning unit are triggered upon detection of sounds that fit within the parameters. The piezo beeper alarm emits a continuous audible high-pitched tone, and the audio output amplifier and programmed voice warning unit plays a digital voice announcement via a speaker, and light emitting diodes become illuminated at the same time the audible high-pitched tone and voice announcement are activated. The circuitry is powered by one or more DC batteries and may be recharged by solar cells.

12 Claims, 4 Drawing Sheets

10A 30C 30 30B 16 14B 16 30E 30F 14 14A 18 30A 30J 31 30D 30J 17 20,20A

MIRROR MOUNTED EMERGENCY VEHICLE ALERT SYSTEM

CROSS REFERENCE TO RELATED APPLICATION

This application claims priority of U.S. Provisional Application Ser. No. 60/330,952, filed Nov. 5, 2001.

BACKGROUND OF THE INVENTION

1. Field of the Invention

This invention relates generally to emergency vehicle alert systems and apparatus mounted to the interior rearview mirror of a vehicle, and more particularly to an emergency vehicle alert system coupled with an interior rearview mirror of a vehicle that will visually and audibly alert a driver of the presence of an emergency vehicle or railroad train in the proximity so that the driver may respond appropriately.

2. Background Art

Emergency vehicles, such as ambulances, police cars and fire trucks and equipped with acoustical sirens for signaling their presence. Similarly, railroad trains and many railroad crossings are equipped with acoustic signals to warn drivers of the approaching train. Many accidents are caused because a driver did not hear the warning signal of the emergency vehicle or train due to the soundproofed interior and/or background noise of internal radios, heaters, air conditioners and other sound producing devices present in modern motor vehicles, or because they may have been engaged in a telephone conversation using a cell phone. Hearing-impaired drivers are also put at risk when they are unable to see the flashing lights of the emergency vehicle.

Various methods and systems have been proposed to inform a vehicle driver of the proximity of an emergency vehicle however, many proposed emergency vehicle warning systems are located in the vehicle interior in a position that would cause distraction and require the driver to redirect his or her eyes away from the front of the vehicle.

Conventional rearview mirrors are mounted in a housing at one end of a pivotal, double ball joint mounting arm which is connected at its other end to a coupling channel member which is received on a mounting button fixed to the inner facing surface of the vehicle windshield with adhesive or epoxy, or the mirror housing may be mounted at the end of a single pivot mounting arm attached to the vehicle in the header roof area above the windshield. Most common rearview mirror assemblies are typically used only for rear vision. However, recently various additional electronic, electric and functional features, such as map reading lights, have been added to the rearview mirror assembly.

Therefore, it would be advantageous to provide an emergency vehicle alert system coupled with an interior rearview mirror of a vehicle that will both visually and audibly alert a driver of the presence of an emergency vehicle or railroad train in the proximity so that the driver may respond appropriately without causing distraction or requiring the driver to redirect his or her eyes away from the front of the vehicle.

The present invention is distinguished over the prior art in general, and these patents in particular by an emergency vehicle alert system coupled with an interior rearview mirror assembly attached to the windshield or a header portion of a vehicle that will visually and audibly alert a driver of the presence of an emergency vehicle or railroad train in the proximity so that the driver may respond appropriately. A sound transducer having a probe engaged with the windshield receives acoustical warning signals from emergency vehicles and other vehicles, converts them into electrical audio frequency signals and sends them to an audio pre-amplifier which amplifies the signals and feeds them to a sound discriminator calibrated to evaluate and discriminate between signals that fit within parameters set for particular emergency sound frequencies. A piezo beeper alarm and an audio output amplifier and programmed voice warning unit are triggered upon detection of sounds that fit within the parameters. The piezo beeper alarm emits a continuous audible high-pitched tone, and the audio output amplifier and programmed voice warning unit plays a digital voice announcement via a speaker, and light emitting diodes become illuminated at the same time the audible high-pitched tone and voice announcement are activated. The circuitry is powered by one or more DC batteries and may be recharged by solar cells.

SUMMARY OF THE INVENTION

It is therefore an object of the present invention to provide an emergency vehicle alert system conveniently located within the interior of a vehicle that will both visually and audibly alert a driver of the presence of an emergency vehicle or railroad train in the proximity so that the driver may respond appropriately without causing distraction or requiring the driver to redirect his or her eyes away from the front of the vehicle.

It is another object of this invention to provide an emergency vehicle alert system that is easily integrated into a vehicle with little or no impact on the vehicle interior.

Another object of this invention is to provide an emergency vehicle alert system coupled with an interior rearview mirror of a vehicle that will not cause distraction or require the driver to redirect his or her eyes away from the front of the vehicle.

Another object of this invention is to provide an emergency vehicle alert system that can be easily and quickly installed on an existing interior rearview mirror assembly without the use of special tools.

A further object of this invention is to provide an interior rearview mirror assembly that includes an emergency vehicle alert system.

A still further object of this invention is to provide an emergency vehicle alert system coupled with an interior rearview mirror assembly, that is simple in construction, inexpensive to manufacture, and rugged and reliable in operation.

Other objects of the invention will become apparent from time to time throughout the specification and claims as hereinafter related.

The above noted objects and other objects of the invention are accomplished by an emergency vehicle alert system coupled with an interior rearview mirror assembly attached to the windshield or a header portion of a vehicle that will visually and audibly alert a driver of the presence of an emergency vehicle or railroad train in the proximity so that the driver may respond appropriately. A sound transducer having a probe engaged with the windshield receives acoustical warning signals from emergency vehicles and other vehicles, converts them into electrical audio frequency signals and sends them to an audio pre-amplifier which amplifies the signals and feeds them to a sound discriminator calibrated to evaluate and discriminate between signals that fit within parameters set for particular emergency sound frequencies. A piezo beeper alarm and an audio output amplifier and programmed voice warning unit are triggered upon detection of sounds that fit within the parameters. The piezo beeper alarm emits a continuous audible high-pitched tone, and the audio output amplifier and programmed voice warning unit plays a digital voice announcement via a speaker, and light emitting diodes become illuminated at the same time the audible high-pitched tone and voice announcement are activated. The circuitry is powered by one or more DC batteries and may be recharged by solar cells.

DESCRIPTION OF THE PREFERRED EMBODIMENTS

Figure 1:
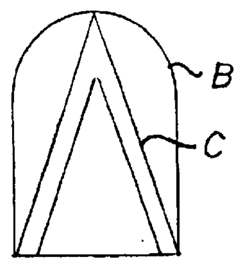
FIG. 1 is a rear elevation of a mounting button that attaches to a vehicle windshield.

Referring to the drawings by numerals of reference, there is shown in FIGS. 1–5, a dual case embodiment of a mirror mounted emergency vehicle alert system 10. FIG. 1 shows schematically a conventional rearview mirror mounting button B which is typically fixed to the inner facing surface of the vehicle windshield with adhesive or epoxy and has a mounting channel C on its outer facing side for slidably receiving a mating coupling mounting member of the rearview mirror.

As seen in FIGS. 2–5, in this embodiment of the emergency vehicle alert system, a first small generally rectangular housing or case 11 having a back side wall 11A, a front side wall 11B, top and bottom walls 11C and 11D, and lateral side walls 11E and 11F, is provided with a coupling portion 12 at the center of its back side wall 11A which has a channel 13 configured to be slidably received on the channel C of the conventional mounting button B and secured thereto by a set screw (not shown), as is well known in the art. A first ball member 14A at one end of a pivotal, double ball joint mounting arm 14 is connected to the front side wall 11A of the housing or case 11 and a second ball member 14B at the opposed end of the mounting arm is connected to the back side wall of a second generally rectangular case 15. Solar cell panels 16 are mounted on the back side wall 11A on each side of the coupling portion 12 of the first case 11 so as to be disposed closely adjacent to the vehicle windshield to receive sunlight. The solar cell panels 16 are connected to one or more DC power supply batteries contained within the housing or case (not shown) to charge them. It should be understood, that the solar cell panels may be eliminated wherein power is supplied by DC batteries alone.

Figure 11:
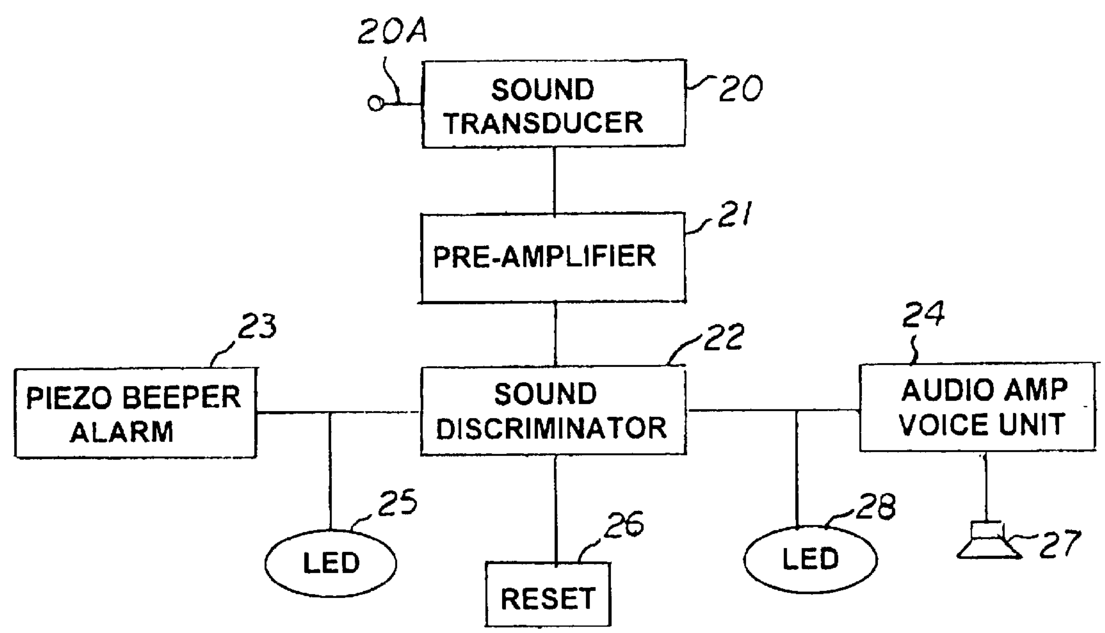
FIG. 11 is a schematic block diagram of the components of the emergency vehicle alert system.

Referring additionally to FIG. 11, a sound transducer 20 for sending and receiving signals (described hereinafter) is mounted inside the housing or case 11 and has an external probe 20A that extends through an aperture 17 in the back side wall 11A of the housing or case. A transducer adjustment 18, which may be a knob or a slide is provided on the side wall 11E of the housing or case 11 for adjusting the transducer probe to be tightly engaged against the windshield.

An audio pre-amplifier 21, a sound discriminator 22, a piezo beeper alarm 23, an audio output amplifier and programmed voice warning unit 24, and a DC battery for powering the circuitry, are all mounted inside the housing or case 11. The front side wall 11B of the housing or case 11 has a grille or series of apertures 11G for allowing the beeper alarm sound to be clearly heard through the housing or case. An LED 25 is mounted in the front side wall of the housing or case 11 beneath the grille or apertures 11G, and a reset switch 26 is mounted beneath the LED 25.

Figure 2:
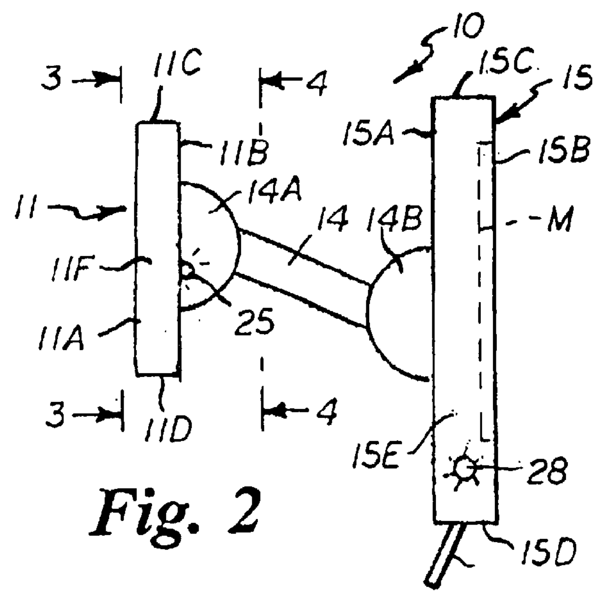
FIG. 2 is a side elevation of a dual case embodiment of the mirror mounted emergency vehicle alert system in accordance with the present invention.
Figure 3:
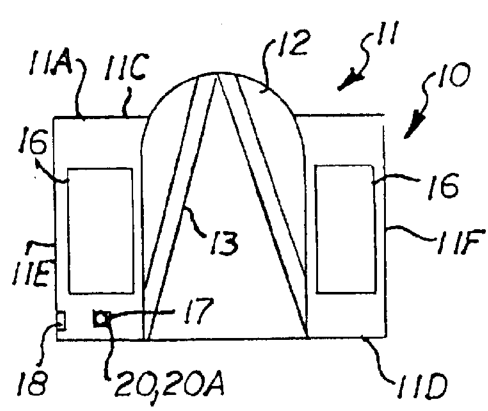
FIG. 3 is a rear elevation of the first case of the embodiment of FIG. 2.
Figure 4:
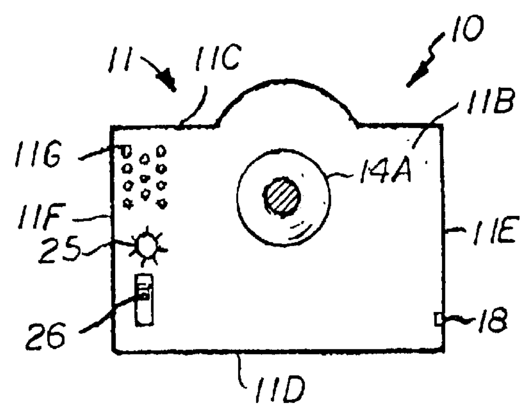
FIG. 4 is a front elevation of the first case of the embodiment of FIG. 2.
Figure 5:
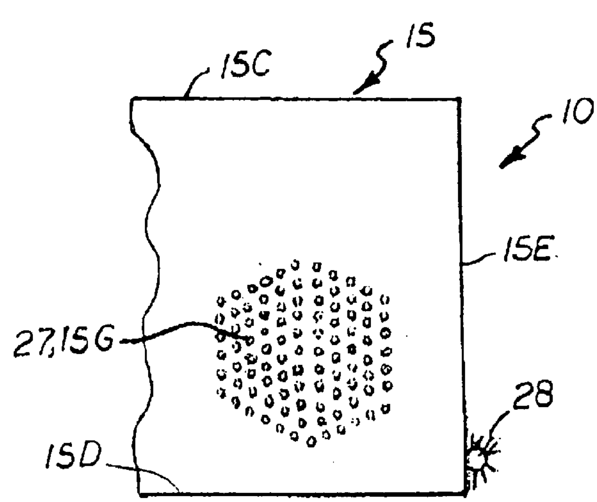
FIG. 5 is a partial rear elevation of the second case of the embodiment of FIG. 2.

As shown in FIGS. 2 and 5, the second case 15 is generally rectangular member having a back side wall 15A, a front side wall 15B, top and bottom walls 15C and 15D, and lateral side walls 15E (only one of which is shown). The second ball member 14B at the opposed end of the mounting arm 14 is connected to the back side wall 15A. A speaker 27 is mounted inside the housing or case 15 and the back side wall 15A of the housing or case has a grille or series of apertures 15G for allowing sounds to be clearly heard through the housing or case. A second LED 28 is mounted in the lateral side wall 15E of the case 15 on the driver's side. It should be understood, that the components may be arranged differently in the first and second cases 11 and 15 than described above.

The front side 15B of the housing or case 15 is configured to have a conventional rearview mirror assembly M mounted therein and its bottom side wall 15D may be provided with an opening through which the two-position toggle lever L extends for adjusting the mirror between a daytime position and a nighttime position. The rearview mirror assembly M and toggle lever L are of conventional well known construction, and thus are not shown and described in detail.

Figure 6:
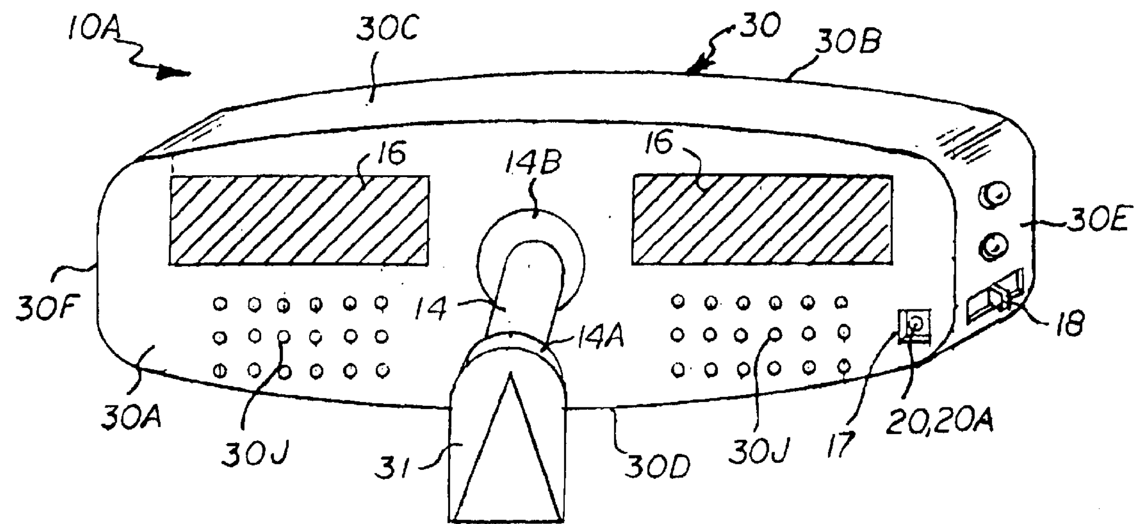
FIG. 6 is a rear elevation of a single case mirror mounted emergency vehicle alert system in accordance the present invention.
Figure 7:
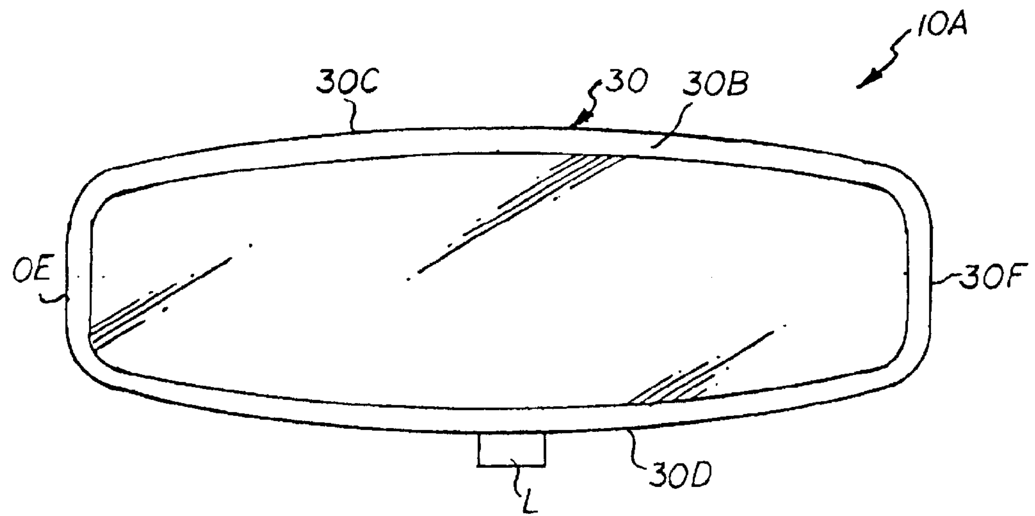
FIG. 7 is a front elevation of the single case embodiment of FIG. 6.

FIGS. 6 and 7 show a single housing or case embodiment 10A which can be attached to the windshield of the vehicle. In this embodiment, a single generally rectangular housing or case 30 having a back side wall 30A, a front side wall 30B, top and bottom walls 30C and 30D, and lateral side walls 30E and 30F. The back side wall 30A is coupled with a ball member 14B at one end of a double ball joint mounting arm 14. The ball 14A at the other end of the mounting arm 14 is connected with a conventional mounting coupling 31 other conventional fastener which is attached to the windshield.

Figure 8:
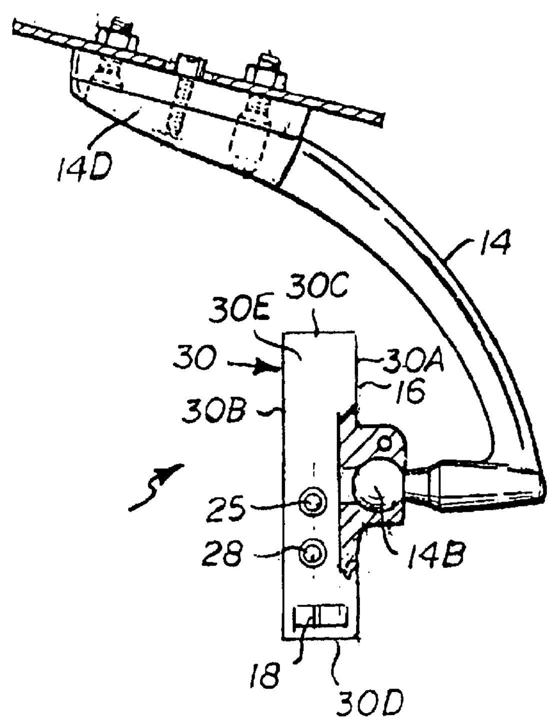
FIG. 8 is a side elevation of a single case mirror mounted emergency vehicle alert system connected with a single pivot mounting arm.

FIG. 8 shows a modification of the single housing or case embodiment 10B which can be attached to the vehicle in the header roof area above the windshield with a single pivot mounting arm 14C. In this embodiment, the back side wall 30A, is provided with a socket that receives a ball member 14B at one end of the single pivot mounting arm 14C. The other end of the single pivot mounting arm 14C has a mounting coupling or other conventional fastener 14D which is attached to the vehicle in the header roof area above the windshield.

Figure 9:
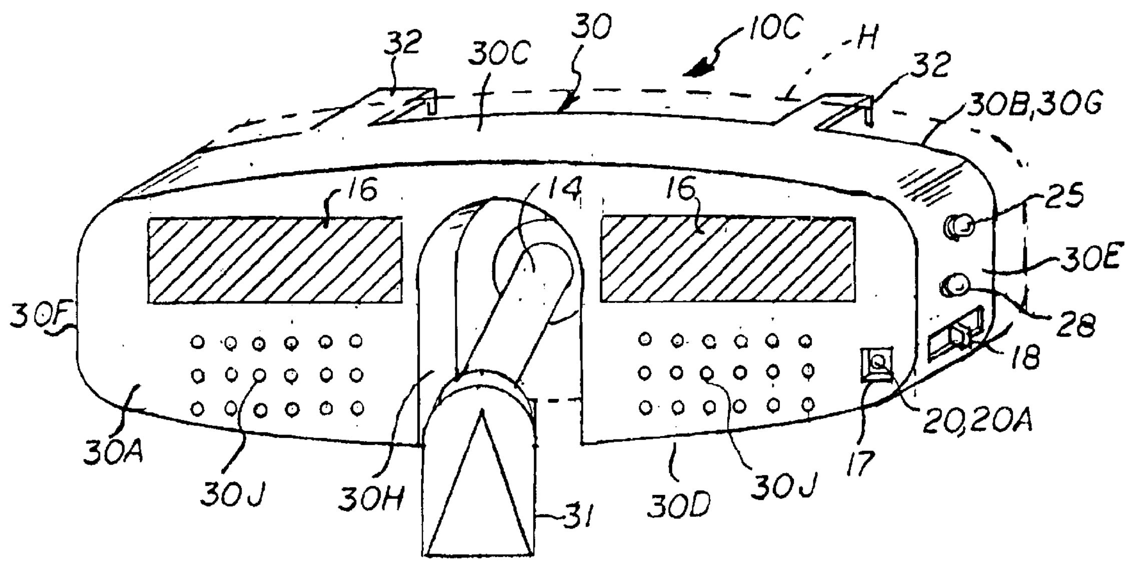
FIG. 9 is a rear elevation of a single case mirror mounted emergency vehicle alert system connected with an existing mirror assembly in accordance the present invention.
Figure 10:
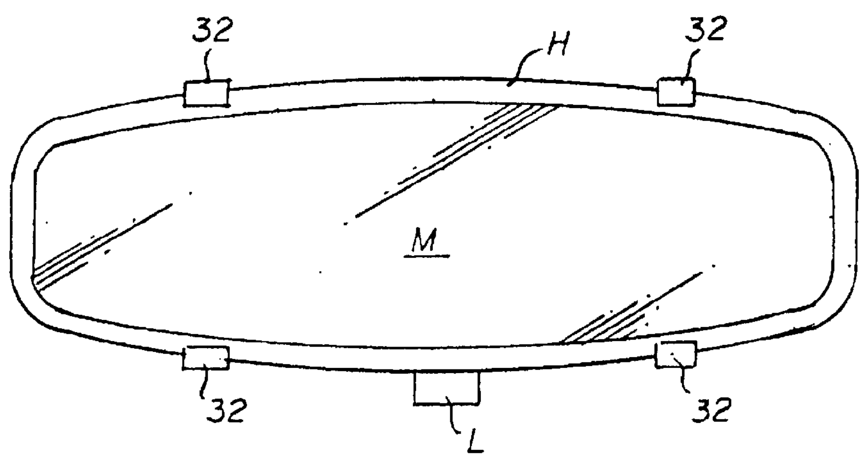
FIG. 10 is a front elevation of the single case embodiment of FIG. 9.

FIGS. 9 and 10 show another modification of the single housing or case 10C wherein the front side 30B of the case 30 is enclosed by a front wall 30G which is sized and shaped to be received on the back side of a conventional rearview mirror case or housing H, and resilient clips 32 are provided on the top and bottom walls 30C and 30D for releasably attaching it to the existing mirror housing. The single housing or case 30 is provided with a central contoured portion or recess 30H to accommodate the pivot mounting arm 14 extending from the rear of the mirror housing.

In the single housing or case embodiment of FIGS. 6–10, solar cell panels 16 are mounted on the back side wall 30A and connected with one or more DC power supply batteries (not shown) contained within the housing or case. It should be understood, that the solar cell panels may be eliminated wherein power is supplied by DC batteries alone.

Referring additionally to FIG. 11, the sound transducer 20 for sending and receiving signals (described hereinafter) is mounted inside the single housing or case 30 and has an external probe 20A that extends through an aperture 17 in the back side wall 30A of the housing or case 30, and the transducer adjustment 18 is provided on the side wall 30E of the housing or case for adjustably extending the transducer probe to tightly engage the windshield. The audio per-amplifier 21, sound discriminator 22, piezo beeper alarm 23, audio output amplifier and programmed voice warning unit 24, and speaker 27 are all mounted inside the case 30. The back side wall 30A of the single housing or case 30 has a first and second speaker grilles or series of apertures 30J to allow the beeper alarm sound and voice announcement to be clearly heard through the housing or case. A first and a second LED 25 and 28 are mounted in the lateral side wall 30E of the housing or case on the driver's side, and the reset switch (not shown) is mounted on the opposed side wall 30F. As with the previous embodiment, the solar cells panels may be eliminated wherein power is supplied by DC batteries alone.

The front side 30B of the single housing or case 30 is configured to have a conventional rearview mirror assembly M mounted therein, or configured to attach to a conventional rearview mirror assembly, and its bottom side wall 30D may be provided with an opening through which the two-position toggle lever L extends for adjusting the mirror between a daytime position and a nighttime position. The rearview mirror assembly M and toggle lever L are of conventional well known construction, and thus are not shown and described in detail.

The wiring circuitry of the components of the emergency vehicle alert system is conventional and readily apparent to those skilled in the art, and therefore the electrical circuitry is not shown and described in detail. In the embodiment with two housings or cases 11 and 15 of FIGS. 2–5, the audio output amplifier and programmed voice warning unit 24 in the first case 11 may be connected with the speaker 27 and LED 28 in the second case 15 by wires that extend through bores formed in the ball members 14A, 14B and mounting arm 14, or by wireless communication.

Operation

Referring now to FIG. 11, the warning sounds of emergency vehicles such as ambulances, fire trucks and other vehicles such as railroad trains are transmitted in the form of an acoustical energy sound wave within certain frequency ranges.

The probe 20A of the sound transducer 20, which is engaged on the windshield, receives these acoustical sound waves and converts them to electrical audio frequency signals. The electrical audio frequency signals from the transducer 20 are sent to the pre-amplifier 21. The pre-amplifier 21 amplifies the signals and feeds them to the sound discriminator 22.

The sound discriminator 22 is calibrated to evaluate and discriminate between the sounds that that fit within the parameters set for those particular types of emergency sound frequencies, and then simultaneously upon detection of signals within the set parameters, trigger the piezo beeper alarm 23 and the audio output amplifier and programmed voice warning unit 24.

The piezo beeper alarm 23 emits a continuous audible high-pitched tone, and the output amplifier and programmed voice warning unit 24 plays a digital voice announcement via the speaker 27 in the housing or case. A typical voice announcement message may be, for example, "warning, you are in close vicinity to an emergency vehicle".

The LED 25 and LED 28 are connected with the piezo beeper alarm 23 and the output amplifier and programmed voice warning unit 24, respectively, so as to become illuminated at the same time the audible high-pitched tone and voice announcement are activated.

While this invention has been described fully and completely with special emphasis upon preferred embodiments, it should be understood that within the scope of the appended claims the invention may be practiced otherwise than as specifically described herein.

What is claimed is:

1. An emergency vehicle alert system for attachment to an interior rear view mirror assembly of a vehicle wherein the rearview mirror assembly has a housing with a mirror mounted in a front side and a back side facing the vehicle windshield, the alert system comprising:

at least one case containing an electronic emergency vehicle alert system including emergency signal receiving, discriminating, and processing circuitry for receiving acoustical warning signals transmitted from an emergency vehicle and processing sound signals within parameters set for particular warning sound signals, an audible alarm and at least one LED activated upon detection of signals within the set parameters to produce an audible and visual warning, and a DC power supply for supplying power to the circuitry; and said at least one case configured to be detachably fixed on said rearview mirror assembly to reside between the back side of the mirror housing and the vehicle windshield;

said emergency signal receiving, discriminating, and processing circuitry comprising a sound transducer for sending and receiving signals having a probe engageable with the vehicle windshield, a piezo beeper alarm, an audio pre-amplifier, a sound discriminator, an audio output amplifier and programmed voice warning unit, a speaker, and a DC power supply for powering the circuitry, and said case having apertures to allow said beeper alarm sounds and voice announcements to be clearly heard through the case, and a first and second light emitting diode mounted thereon connected with said piezo beeper alarm and said audio output amplifier and programmed voice warning unit, respectively; wherein said transducer probe receives warning signals in the form of acoustical energy sound waves within certain frequency ranges transmitted by emergency vehicles and other vehicles, converts them into electrical audio frequency signals and sends the electrical signals to said audio pre-amplifier which amplifies the electrical signals and feeds them to said sound discriminator, said sound discriminator being calibrated to evaluate and discriminate between signals that that fit within the parameters set for particular emergency sound frequencies;

said piezo beeper alarm and said audio output amplifier and programmed voice warning unit are triggered upon said sound discriminator detecting sounds that that fit within the parameters set for particular types of emergency sound frequencies; and said piezo beeper alarm emits a continuous audible high-pitched tone, and said audio output amplifier and programmed voice warning unit plays a digital voice announcement via said speaker, and said first and second light emitting diodes become illuminated at the same time the audible high-pitched tone and voice announcement are activated.

2. The emergency vehicle alert system according to claim 1, wherein said DC power supply comprises one or more DC batteries.

3. The emergency vehicle alert system according to claim 2, further comprising:

at least one solar cell panel arranged on said case to receive sunlight and connected with said one or more DC batteries to charge the same.

4. A combination interior rearview mirror assembly and emergency vehicle alert system for a vehicle windshield, comprising:

at least one case;

a mirror coupled to a front side of said case;

an articulating arm coupled to said case, said articulating arm adapted for mounting said combination interior rearview mirror assembly and emergency vehicle alert system to said vehicle;

an electronic emergency vehicle alert system disposed in said at least one case including emergency signal receiving, discriminating, and processing circuitry for receiving acoustical warning signals transmitted from an emergency vehicle and processing sound signals within parameters set for particular warning sound signal frequencies, an audible alarm and at least one LED in said at least one case activated upon detection of signals within the set parameters to produce an audible and visual warning, and a DC power supply for supplying power to the circuitry;

said emergency signal receiving, discriminating, and processing circuitry comprising a sound transducer for sending and receiving signals having a probe engageable with the vehicle windshield, a piezo beeper alarm, an audio pre-amplifier, a sound discriminator, an audio output amplifier and programmed voice warning unit, a speaker, and a DC power supply for powering the circuitry, and said case having apertures to allow said beeper alarm sounds and voice announcements to be clearly heard through the case, and a first and second light emitting diode mounted thereon connected with said piezo beeper alarm and said audio output amplifier and programmed voice warning unit, respectively; wherein said transducer probe receives warning signals in the form of acoustical energy sound waves within certain frequency ranges transmitted by emergency vehicles and other vehicles, converts them into electrical audio frequency signals and sends the electrical signals to said audio pre-amplifier which amplifies the electrical signals and feeds them to said sound discriminator, said sound discriminator being calibrated to evaluate and discriminate between signals that that fit within the parameters set for particular emergency sound frequencies;

said piezo beeper alarm and said audio output amplifier and programmed voice warning unit are triggered upon said sound discriminator detecting sounds that that fit within the parameters set for particular types of emergency sound frequencies; and said piezo beeper alarm emits a continuous audible high-pitched tone, and said audio output amplifier and programmed voice warning unit plays a digital voice announcement via said speaker, and said first and second light emitting diodes become illuminated at the same time the audible high-pitched tone and voice announcement are activated.

5. The combination interior rearview mirror assembly and emergency vehicle alert system according to claim 4, wherein said DC power supply comprises one or more DC batteries.

6. The combination interior rearview mirror assembly and emergency vehicle alert system according to claim 5, further comprising:

at least one solar cell panel arranged on a back side of said at least one case to receive sunlight and connected with said one or more DC batteries to charge the same.

7. The combination, interior rearview mirror assembly and emergency vehicle alert system according to claim 4, wherein said at least one case is configured to be detachably mounted on a back side of a rearview mirror housing to reside between the back side of the mirror housing and the vehicle windshield.

8. The combination interior rearview mirror assembly and emergency vehicle alert system according to claim 4, wherein said at least one case is configured to be detachably mounted on a back side of a rearview mirror housing to reside between the back side of the mirror housing and the vehicle windshield;

said articulating arm coupled to a back side of said mirror housing at a first end and adapted for attachment to said vehicle at a distal end; and said at least one case is configured accommodate said first end of said articulating arm.

9. The combination interior rearview mirror assembly and emergency vehicle alert system according to claim 4, wherein said at least one case comprises a first case and a second case, said first case configured to be detachably mounted on a mounting button fixed to the vehicle windshield; and said articulating arm is coupled to a back side of said first case at a distal end, and coupled to a back side of said second case at a proximal end.

10. The combination interior rearview mirror assembly and emergency vehicle alert system according to claim 9, wherein said sound transducer is contained in said first case;

said piezo beeper alarm, said audio pre-amplifier, said sound discriminator, said audio output amplifier and programmed voice warning unit, said speaker, and said DC power supply is contained in either of said first case and said second case, and said first and second light emitting diode is mounted on either of said first case and said second case; and either of said first case and said second case has apertures to allow said beeper alarm sounds and voice announcements to be clearly heard through the case.

11. The combination interior rearview mirror assembly and emergency vehicle alert system according to claim 10, wherein said DC power supply comprises one or more DC batteries.

12. The combination interior rearview mirror assembly and emergency vehicle alert system according to claim 11, further comprising:

at least one solar cell panel arranged on a back side of said first case to receive sunlight and connected with said one or more DC batteries to charge the same.

* * * * *